(12) United States Patent
Price et al.

(10) Patent No.: US 8,724,017 B2
(45) Date of Patent: *May 13, 2014

(54) AUTO EXPOSURE TECHNIQUES FOR VARIABLE LIGHTING CONDITIONS

(71) Applicant: Apple Inc., Cupertino, CA (US)

(72) Inventors: Douglas S. Price, San Jose, CA (US); Xiaosong Zhou, Campbell, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/677,887

(22) Filed: Nov. 15, 2012

(65) Prior Publication Data

US 2013/0070151 A1  Mar. 21, 2013

Related U.S. Application Data

(63) Continuation of application No. 12/849,099, filed on Aug. 3, 2010, now Pat. No. 8,325,890.

(60) Provisional application No. 61/351,901, filed on Jun. 6, 2010.

(51) Int. Cl.
H04N 5/235 (2006.01)

(52) U.S. Cl.
USPC ........................................ 348/362; 348/14.01

(58) Field of Classification Search
USPC ........... 379/93.17, 93.21, 88.13, 158, 202.01; 348/14.01, 14.02, 14.03, 14.07, 14.15, 348/14.16, 362, 363, 361
See application file for complete search history.

(56) References Cited

U.S. PATENT DOCUMENTS

| | | | |
|---|---|---|---|
| 5,703,644 A | 12/1997 | Mori et al. | |
| 2003/0071908 A1 | 4/2003 | Sannoh et al. | |
| 2007/0196097 A1 | 8/2007 | Sugimoto | |
| 2010/0195906 A1 | 8/2010 | Uliyar et al. | |
| 2011/0249961 A1 | 10/2011 | Brunner | |
| 2011/0293259 A1* | 12/2011 | Doepke et al. | 396/236 |
| 2012/0262599 A1* | 10/2012 | Brunner | 348/222.1 |
| 2012/0300110 A1* | 11/2012 | Miyazaki | 348/333.02 |
| 2012/0314095 A1* | 12/2012 | Fukui | 348/220.1 |

* cited by examiner

*Primary Examiner* — Olisa Anwah
(74) *Attorney, Agent, or Firm* — Wong, Cabello, Lutsch, Rutherford & Brucculeri, LLP

(57) ABSTRACT

Systems, methods, and a computer readable medium for performing auto exposure (AE) techniques that are beneficial in variable lighting conditions—and particularly applicable to handheld and/or mobile videoconferencing applications—are disclosed herein. Handheld and/or mobile videoconferencing applications—unlike their fixed camera counterparts—are often exposed to a wide variety of rapidly changing lighting and scene conditions, and thus face a difficult trade-off between adjusting exposure parameter values too frequently or not frequently enough. In personal electronic devices executing such handheld and/or mobile videoconferencing applications, it may be desirable to: use a small, centered, and center-weighted exposure metering region; set a relatively low brightness target value; and adjust the camera's exposure parameter values according to a distance-dependent convergence speed function. The use of such techniques, in conjunction with a relatively large stability region, may also improve the quality of a video encoder's temporal predictions—and thus video quality—in videoconferencing applications.

25 Claims, 10 Drawing Sheets

AUTO EXPOSURE TECHNIQUES FOR VARIABLE LIGHTING CONDITIONS

BACKGROUND

Today, many personal electronic devices come equipped with digital video cameras. Often, the cameras in these devices perform many functions, such as: image capture, video capture, and videoconferencing. Videoconferencing with handheld and/or mobile personal electronic devices is a much more difficult endeavor than traditional videoconferencing applications, wherein the camera is mostly fixed and the lighting and/or composition of the scenery around the videoconferencing participant(s) does not often change drastically. Thus, it is important that digital video cameras in handheld and/or mobile personal electronic devices be able to capture visually appealing images in a wide variety of lighting and scene conditions with limited or no interaction from the user, while at the same time allowing for the video encoding of the captured image frames to be carried out in the most computationally effective and visually appealing manner.

One feature that has been implemented in some digital cameras to compensate for the lack of dynamic range of the relatively small image sensors typically found in handheld and/or mobile personal electronic devices is known as "auto exposure." Auto exposure (AE) can be defined generally as any algorithm that automatically calculates and/or manipulates certain camera exposure parameter values, e.g., exposure time, gain, or f-number, in such a way that the currently exposed scene is captured in a desired manner. For example, there may be a predetermined optimum brightness value for a given scene that the camera will try to achieve by adjusting the camera's exposure value. Exposure value (EV) can be defined generally as: $\log_2 N^2/t$, wherein N is the relative aperture (f-number), and t is the exposure time (i.e., "shutter speed") expressed in seconds. Some auto exposure algorithms calculate and/or manipulate the exposure parameters, e.g., the camera's gain, such that a mean, center-weighted mean, median, or more complicated weighted value (as in matrix-metering) of the image's brightness will equal a predetermined optimum brightness value in the resultant, auto exposed scene.

In particular, AE methods that are tuned for fixed camera videoconferencing applications typically "meter," i.e., calculate the brightness, on a relatively large area of the image, with a reasonably tight "AE stability region," i.e., range of acceptable brightness values, centered around a fixed, target brightness value (an "AE Target"). In such fixed camera videoconferencing applications, the target brightness value may often be set at or above 18% of the maximum capturable signal strength of the image sensor. The relatively high target brightness values and relatively tight stability regions typically employed in fixed camera videoconferencing applications can be problematic for handheld and/or mobile videoconferencing applications, in which the scene can be strongly back lit or front lit, and in which the scene lighting levels can change often and dramatically.

In mobile videoconferencing applications, it is also paramount to ensure the highest possible video quality at the lowest possible bit rate. Existing video codec standards today, e.g., H.263 or H.264, employ both inter-coding and intra-coding techniques. Intra-coding techniques are performed relative to information that is contained only within the current video frame and not relative to any other frame in the video sequence. Inter-coding techniques, on the other hand, involve temporal processing, that is, rather than reseeding all the information for a subsequent video frame, the codec will only encode and send the changes in pixel location and pixel values from one video frame to the next video frame, while making "temporal predictions" to attempt to take advantage of temporal redundancy between subsequent image frames, thus allowing for higher compression rates. This is an effective technique because, often, a large number of the pixels will not change from one video frame to the next, and it would be redundant to resend all the image information with each video frame. However, the more gradually an AE method changes exposure parameter values, the longer the image frame's average brightness levels are changing, thus making it more difficult for the encoder to make accurate temporal predictions for inter-coding.

Thus, there is need for systems, methods, and a computer readable medium for intelligently and dynamically setting a digital video camera's exposure parameters in such a way as to lead to visually pleasing images and efficiently encoded video streams in handheld and/or mobile videoconferencing applications.

SUMMARY

Auto exposure (AE) algorithms in handheld and/or mobile videoconferencing applications—unlike their fixed camera counterparts—are often exposed to a wide variety of rapidly changing lighting and scene conditions, and thus face a difficult trade-off between adjusting exposure parameter values too frequently or not frequently enough. In personal electronic devices executing such handheld and/or mobile videoconferencing applications, it may be desirable to adjust exposure parameter values gradually, so as to reduce video oscillations causing visually jarring effects on the device's preview screen due to rapidly changing brightness levels. However, adjusting the exposure parameter values too gradually can cause the video encoder to make inaccurate temporal predictions, resulting in poor quality video streams over a large number of frames. Thus, the inventors have discovered various techniques to improve auto exposure methods for use in variable lighting conditions, especially as applied to handheld and/or mobile videoconferencing applications executing on personal electronic devices.

In one embodiment, a small, centered exposure metering region, e.g., an exposure metering rectangle, is used to meter on the subject of the video capture. With handheld videoconferencing applications, the user is generally able to keep the camera pointed at the subject of interest, such that the subject of interest is almost always centered in the image frame. By utilizing a small, centered exposure metering region with a center-weighted metering weighting matrix, this embodiment takes advantage of the likely-centered nature of the subject of interest in the image frame.

In another embodiment, a large "AE stability region" is used to aid in the AE method's determination of when (and to what degree) to adjust exposure parameter values. The AE stability region defines a range of acceptable brightness values for the image frame. The AE stability region may be centered on a fixed, target brightness value. If the "AE Average" for the image frame, i.e., the calculated weighted brightness average over the desired exposure metering region(s), is within the AE stability region, the embodiment may leave the camera's exposure parameter values at theft current levels. However, if the "AE Average" for the image frame is outside of the AE stability region (either higher than the upper limit of the AE stability region or lower than the lower limit of the AE stability region), the embodiment may change the camera's exposure parameter values appropriately to adjust the next frame's AE Average back towards the stability region by a predetermined step size. In one example, the upper limit of the AE stability region is more than twice the lower limit of the AE stability region, and the AE stability region is centered on the target brightness value for the scene, i.e., the "AE Target." Such an AE stability region range is larger than what is typically utilized in traditional, fixed camera videoconferencing applications. Using this larger AE stability region range helps to keep the exposure stable in high contrast scenes, such as those that are strongly back lit or strongly front lit. The larger AE stability region range also helps to reduce oscillations during exposure convergence, as will be described in further detail below.

In yet another embodiment, a fast "AE convergence speed" is used. AE convergence speed may be defined as the rate by which the AE method attempts to bring the scene's AE Average back into an acceptable AE stability region, and AE convergence speed may be manipulated by changing the magnitude of a step size parameter, as will be discussed further below. A fast AE convergence speed, along with a large AE stability region, can improve the appearance of a scene lighting transition by quickly reaching a new "stable" AE Average point, i.e., an AE Average value within the AE stability region. Using a fast AE convergence speed may also aid in the efficiency of the video encoding in videoconferencing applications. In preferred embodiments, the AE convergence speed should be fast, but limited to avoid unwanted video oscillations. As the AE stability region increases in size, the AE convergence speed can be made faster.

In yet another embodiment, a lower AE Target is used than is typically employed in traditional, fixed camera videoconferencing applications. This helps to reduce over-exposure in embodiments using a small, centered and center-weighted exposure metering region. In one example, the AE Target brightness value is set to no more than 17% of the maximum signal strength capturable by the image sensor.

Because of efficiencies and favorable results achieved by the embodiments disclosed herein, the auto exposure techniques for variable lighting conditions described below may be implemented directly in a personal electronic device's hardware and/or software, making the techniques readily applicable to any number of handheld and/or mobile personal electronic devices possessing digital video cameras, e.g. mobile phones, personal data assistants (PDAs), portable music players, or laptop/tablet computers. Alternatively, the auto exposure techniques for variable lighting conditions described below may also be implemented in conventional cameras or traditional, fixed camera videoconferencing applications.

DETAILED DESCRIPTION

This disclosure pertains to systems, methods and a computer readable medium for intelligently and dynamically setting a digital video camera's exposure parameters in such a way as to lead to visually pleasing images and efficiently encoded video streams in handheld and/or mobile videoconferencing applications, especially in scenes with variable lighting conditions. While this disclosure discusses new techniques for AE in handheld and/or mobile videoconferencing applications, one of ordinary skill in the art would recognize that the techniques disclosed may also be applied to other contexts and applications as well. The techniques disclosed herein are applicable to any number of electronic devices with digital image sensors, such as digital cameras, digital video cameras, mobile phones, personal data assistants (PDAs), portable music players, computers, and conventional cameras. An embedded processor, such a Cortex® A8 with the ARM® v7-A architecture, provides a versatile and robust programmable control device that may be utilized for carrying out the disclosed techniques. (CORTEX® and ARM® are registered trademarks of the ARM Limited Company of the United Kingdom.)

In the interest of clarity, not all features of an actual implementation are described in this specification. It will of course be appreciated that in the development of any such actual implementation (as in any development project), numerous decisions must be made to achieve the developers' specific goals (e.g., compliance with system- and business-related constraints), and that these goals will vary from one implementation to another. It will be appreciated that such development effort might be complex and time-consuming, but would nevertheless be a routine undertaking for those of ordinary skill having the benefit of this disclosure. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1:
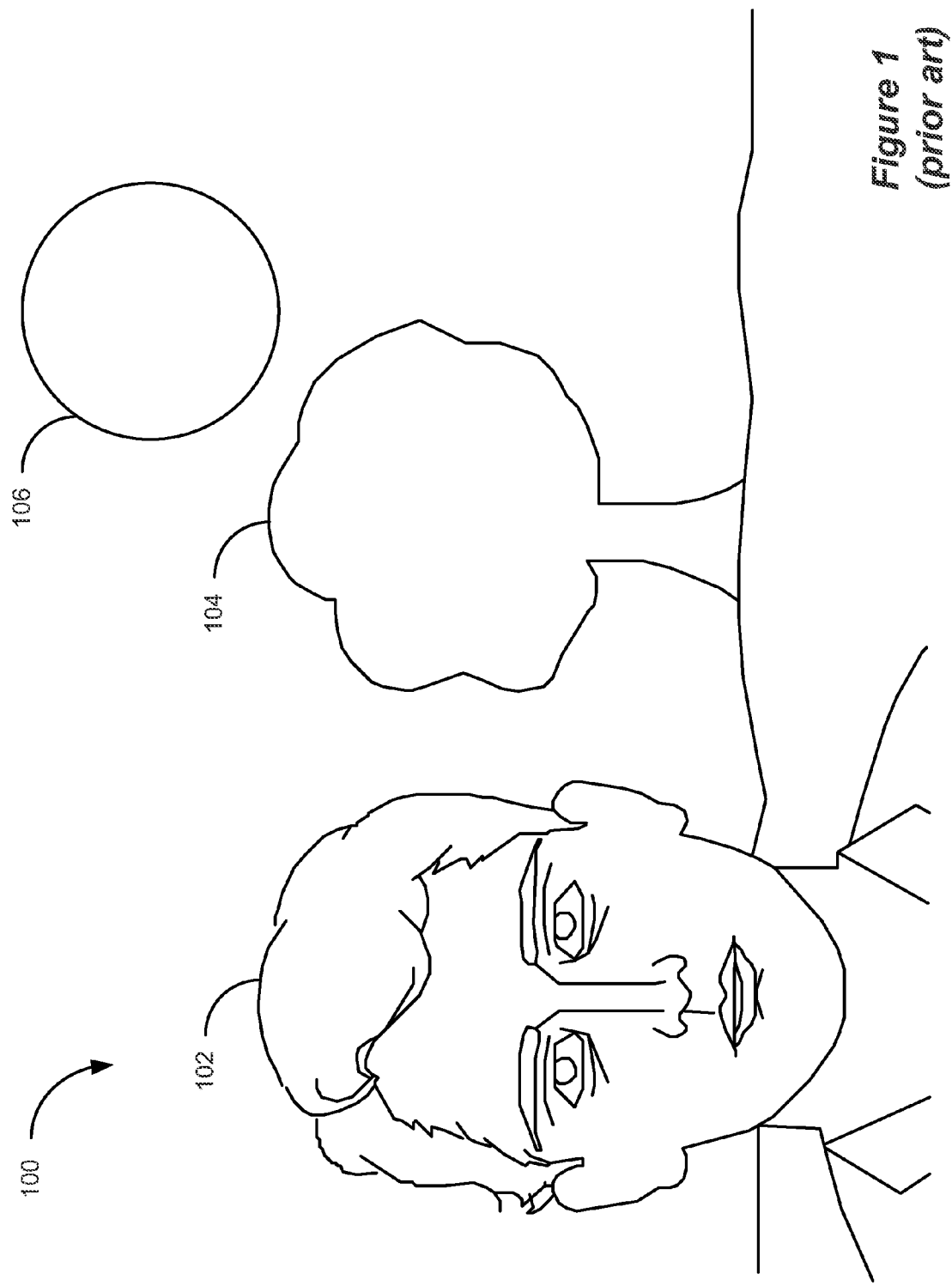
FIG. 1 illustrates a typical outdoor scene with a human subject, in accordance with one embodiment.

Referring now to FIG. 1, a typical outdoor scene 100 with a human subject 102 is shown, in accordance with one embodiment. The scene 100 also includes the Sun 106 and a natural object, tree 104. Regions around the face of human subject 102 will likely have much lower luminance values than regions around objects such as the Sun 106. This is important because, especially in the case of outdoor scenes, such as that shown in FIG. 1, the Sun 106 (or any number of other possible back lighting sources) can have a large—and often detrimental—effect on the way a camera using a standard exposure algorithm meters the scene. Because of the very large brightness values that will be measured in pixels in the upper half of the scene due to the Sun, cameras using a standard exposure algorithm will tend to meter and expose the scene in such a manner that the person's face will be quite dark and the background will be more fully exposed.

Figure 2:
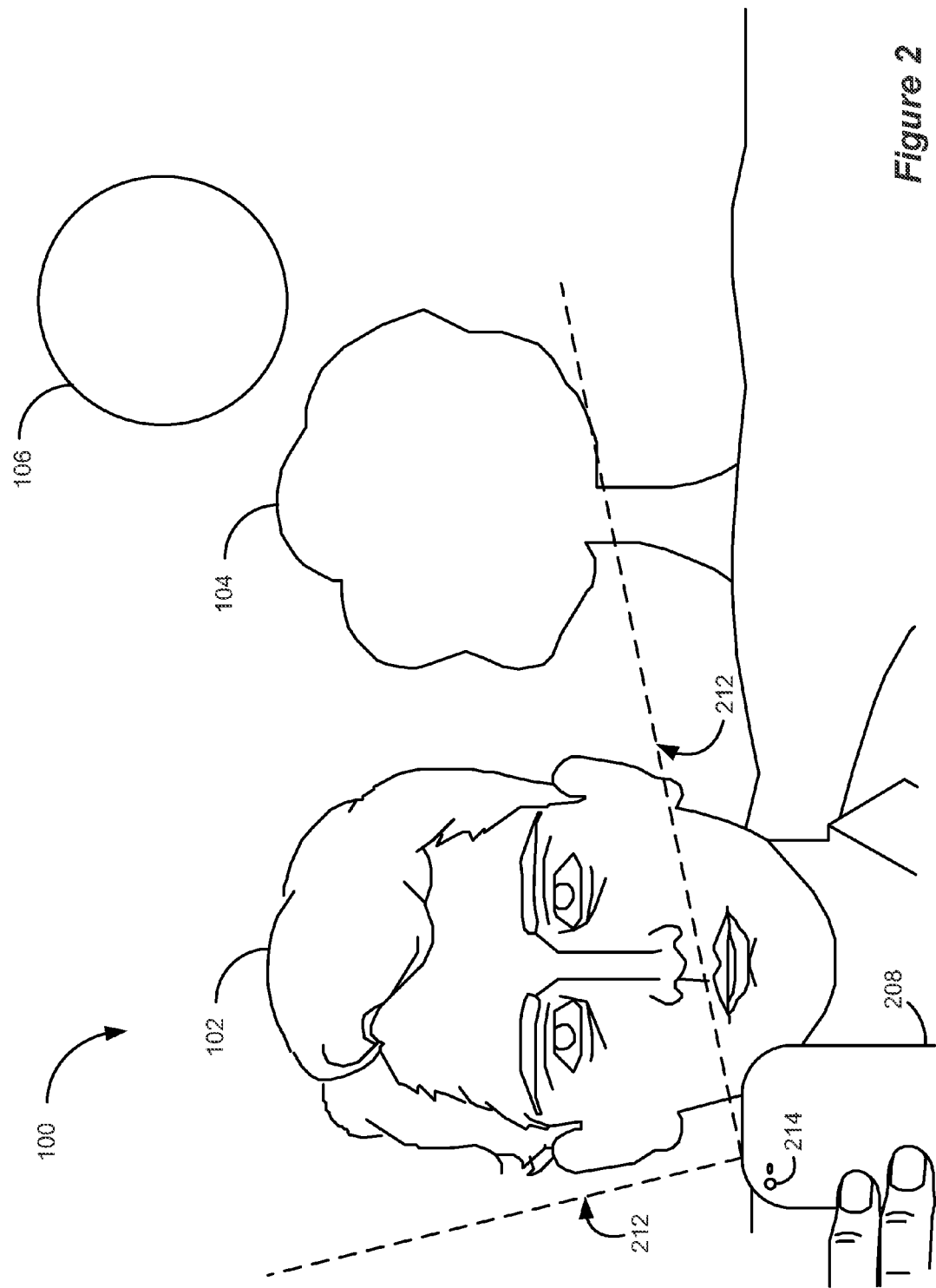
FIG. 2 illustrates a typical outdoor scene with a human subject utilizing a personal electronic device executing a handheld and/or mobile videoconferencing application, in accordance with one embodiment.

Referring now to FIG. 2, a typical outdoor scene 100 with a human subject 102 utilizing a personal electronic device 208 executing a handheld and/or mobile videoconferencing application is shown, in accordance with one embodiment. The dashed lines 212 indicate the viewing angle of the camera (not shown in FIG. 2) on the reverse side of camera device 208, i.e., the side of camera device 208 facing human subject 102 in FIG. 2. As mentioned previously, although camera device 208 is shown here as a mobile phone, the teachings presented herein are equally applicable to any electronic device possessing a camera, such as, but not limited to: digital video cameras, personal data assistants (PDAs), portable music players, laptop/desktop/tablet computers, or conventional cameras. As illustrated in FIG. 2, the camera device 208 may also have a camera 214 on the side of the device that is not facing the human subject 102 during the use of the mobile videoconferencing application. Although the description herein will focus primarily on the camera (not shown in FIG. 2) on the side of camera device 208 facing human subject 102 during the use of the mobile videoconferencing application, it will be understood that either such camera may be utilized in conjunction with the improved AE techniques disclosed herein.

Figure 3:
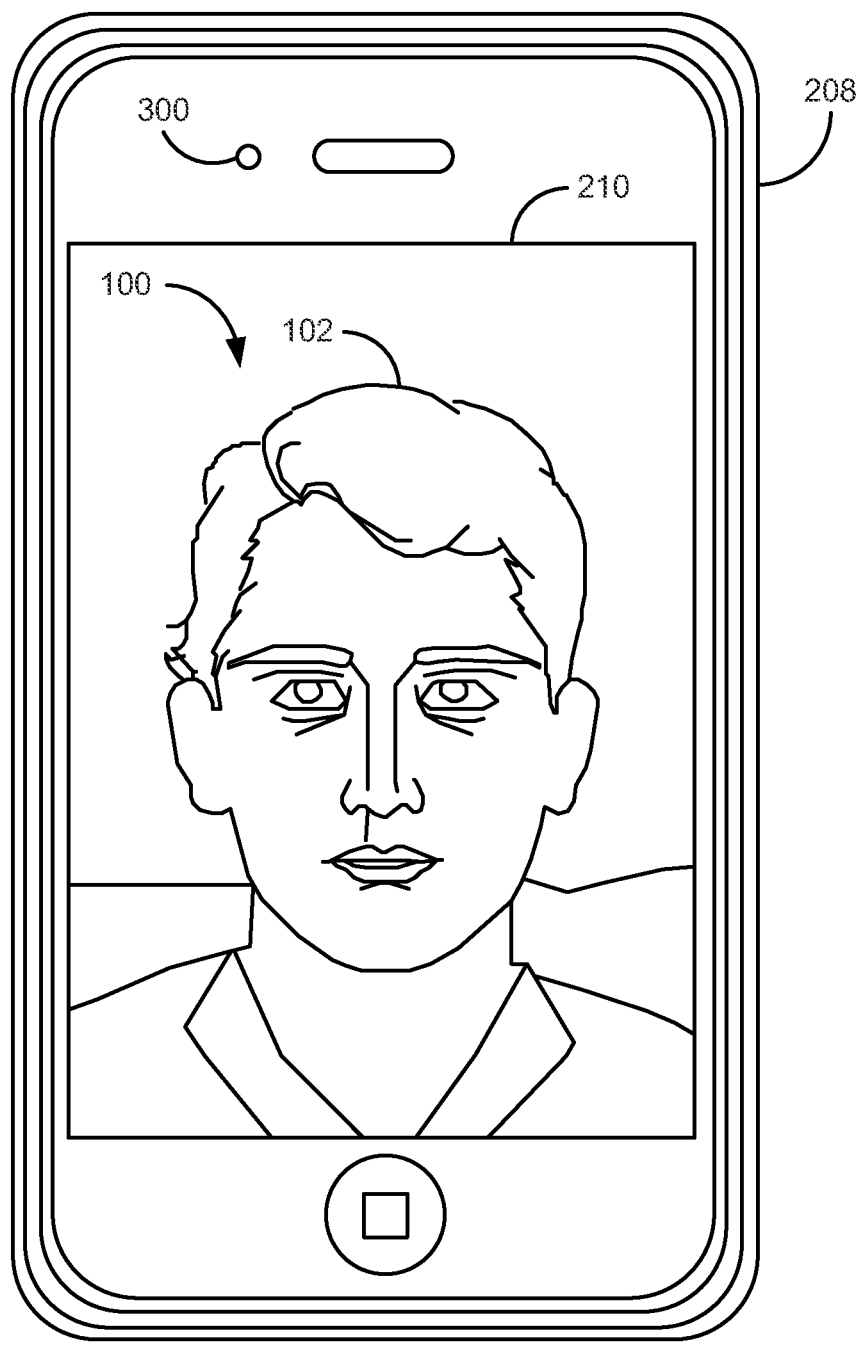
FIG. 3 illustrates a typical outdoor scene with a human subject as viewed on a personal electronic device's preview screen, in accordance with one embodiment.

Referring now to FIG. 3, a typical outdoor scene 100 with a human subject 102 as viewed on a camera device 208's preview screen 210 is shown, in accordance with one embodiment. As shown in FIG. 3, the scene displayed on camera device 208's preview screen 210 has been captured by front-facing camera 300 (recall FIG. 2, which shows human subject 102 holding camera device 208 at roughly arm's length and pointed at his face). As mentioned above, with handheld videoconferencing applications, the user is generally able to keep the camera pointed at the subject of interest (oftentimes himself or herself), such that the subject of interest is almost always centered in the image frame of preview screen 210. As shown in FIG. 3, the human subject of interest 102 is nearly, though not perfectly, centered on preview screen 210.

Figure 4:
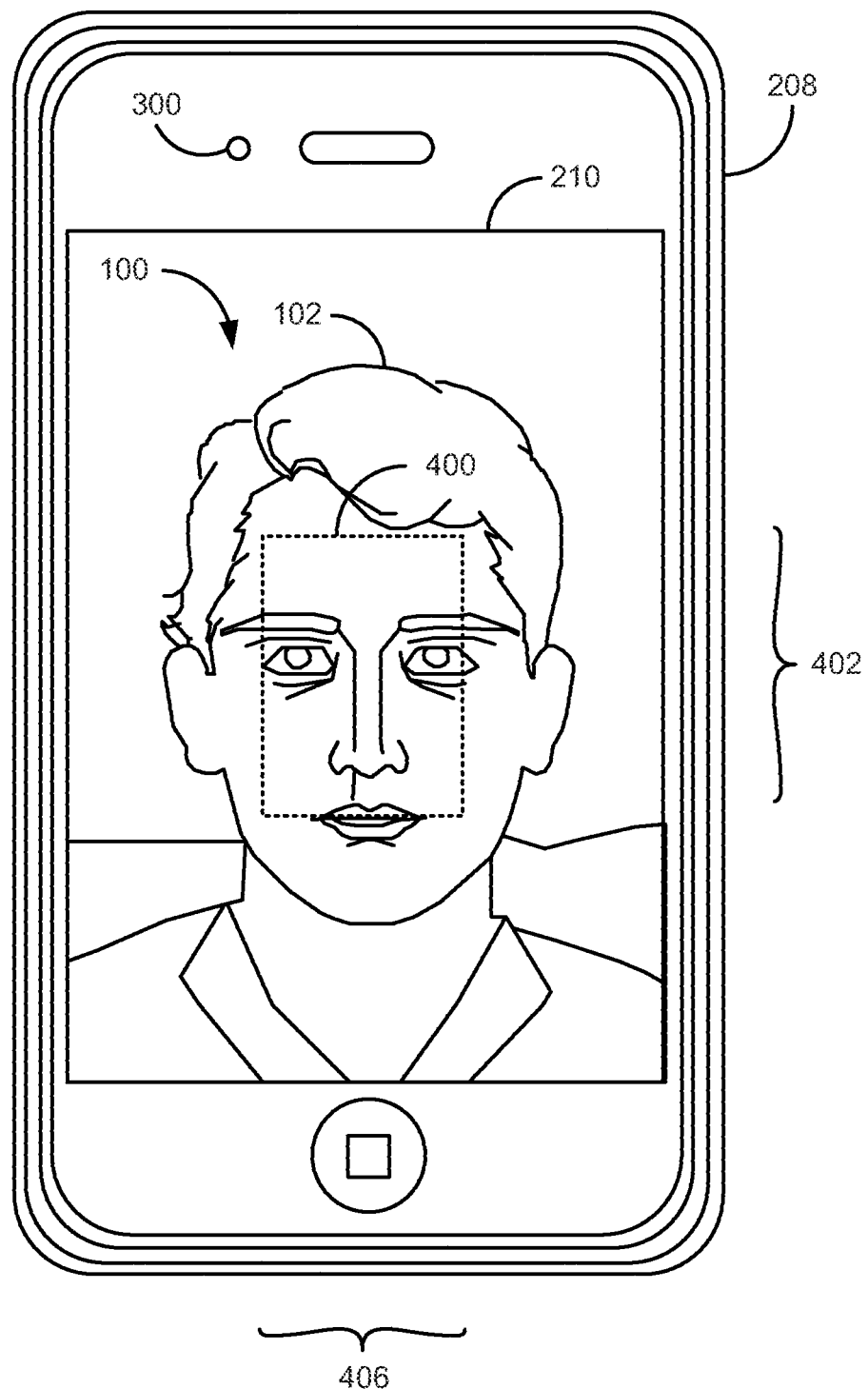
FIG. 4 illustrates a typical exposure metering region for an outdoor scene with a human subject, in accordance with one embodiment.

Referring now to FIG. 4, a typical exposure metering region 100 for an outdoor scene 100 with a human subject 102 is shown, in accordance with one embodiment. In this exemplary embodiment, the exposure metering region is represented by exposure metering rectangle 100 and has dimensions that are one third of the corresponding dimensions of camera device 208's preview screen 210. That is, exposure metering rectangle 400's width 406 is one third of the width of camera device 208's preview screen 210 and exposure metering rectangle 400's height 402 is one third of the height of camera device 208's preview screen 210. The one third dimension choice is not strictly necessary, but it has been empirically determined that choosing an exposure metering rectangle 400 of this size can help exposure determinations from being overly influenced by light sources located at the periphery of the frame, e.g., overhead lights at the top of an image. In another embodiment the dimensions of the exposure metering rectangle are no more than 35% of the corresponding dimensions of the camera device's preview screen. In yet another embodiment, it has been empirically determined that the longer dimension 402 of the exposure metering rectangle 400 may be 50% of the size of the longer dimension of the camera device 208's preview screen 210, while the shorter dimension 406 of the exposure metering rectangle is set to be 35% of the size of the shorter dimension of the camera device 208's preview screen 210.

In another embodiment, the dimensions of the exposure metering rectangle are not fixed to a predetermined portion of the dimensions of the camera device's preview screen. Rather, the dimensions of the exposure metering rectangle may be chosen such that they subtend a particular maximum central angle coming outwards from the exposure metering rectangle of the camera. In one example, the width and height of the exposure metering rectangle each subtend a maximum central angle of 35 degrees. In another example, the longer dimension of the exposure metering rectangle subtends a maximum central angle of 50 degrees, whereas the shorter dimension of the exposure metering rectangle subtends a maximum central angle of 35 degrees. Determining the dimensions of the exposure metering region based on a maximum subtended central angle rather than on a fixed portion of the camera device's preview screen may be advantageous in certain situations, such as when a person or object of interest is very close or far from the camera.

In auto exposure algorithms according to some embodiments disclosed herein, an exposure metering region, such as exposure metering rectangle 400, remains centered in the frame, and the camera's exposure parameters are driven such that the weighted average brightness of the pixels within exposure metering rectangle 400 are equal or nearly equal to an AE Target brightness value, e.g., a 17% gray value. For example, with an image sensor capable of recording 10-bit luminance (i.e., brightness) values, the maximum luminance value is $2^{10}$, or 1024, and, thus, a 17% gray value would be 1024*0.17, or approximately 174. If the scene is sufficiently brighter than the "target" 17°/b gray value, the camera could, e.g., decrease the camera's gain, whereas, if the scene were sufficiently darker than the optimum 17% gray value, the camera could, e.g., increase the camera's gain. A small, centered exposure metering region, such as that explained above with regard to FIG. 3 may work satisfactorily for a scene that has a human subject centered in it, but may need to be adjusted if there is not a human subject in the scene, or if the human subject is not centered in the scene. Such adjustments to the exposure metering region could occur either manually or automatically.

Figure 5:
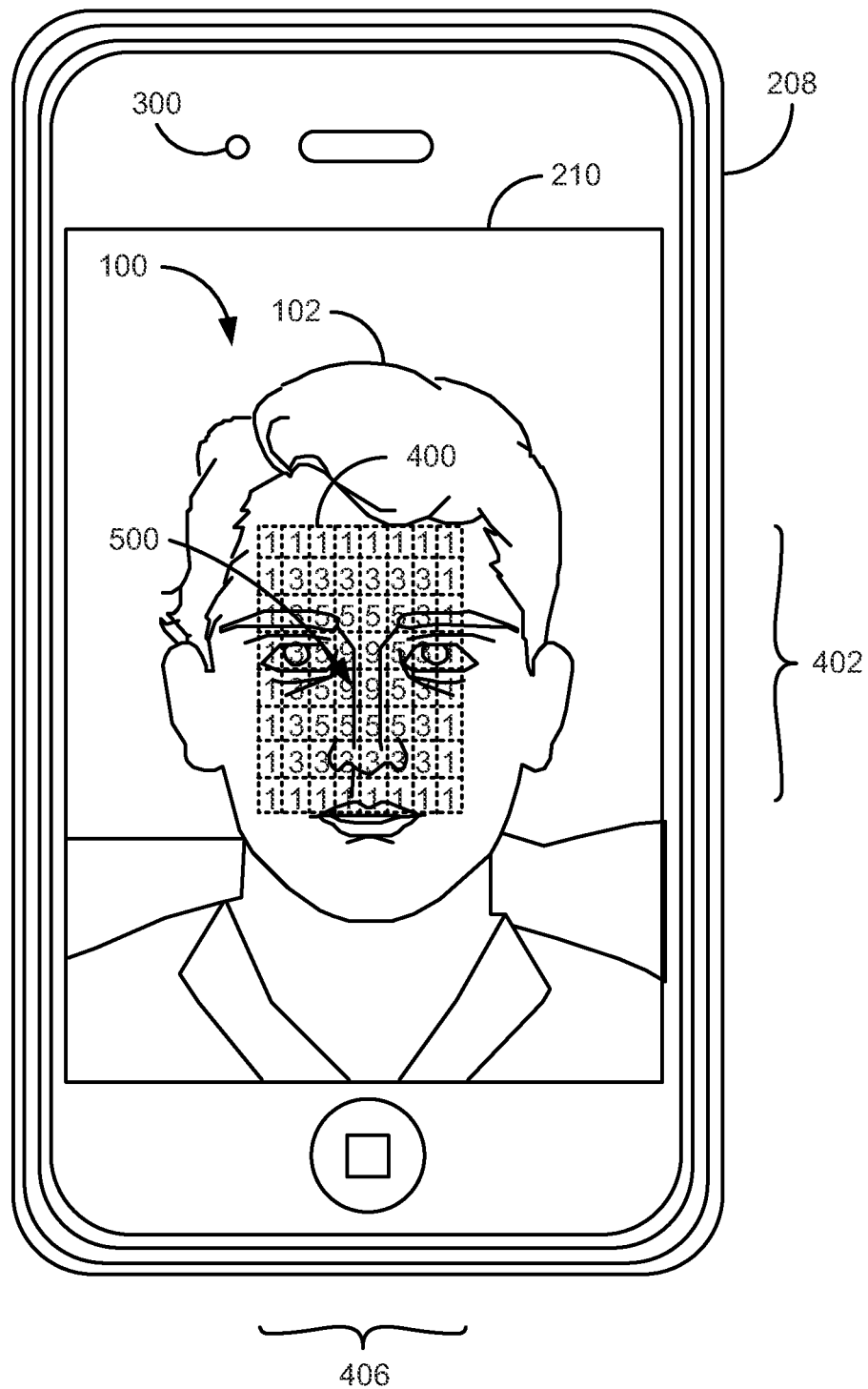
FIG. 5 illustrates a center-weighted metering weighting matrix for a typical exposure metering region over an outdoor scene with a human subject, in accordance with one embodiment.

Referring now to FIG. 5, a center-weighted metering weighting matrix 500 for a typical exposure metering region 400 over an outdoor scene 100 with a human subject 102 is shown, in accordance with one embodiment. As shown in FIG. 5, center-weighted metering weighting matrix 500 consists of 64 equally-sized regions—eight rows and eight columns—that have been assigned various "weights" comprising metering weighting matrix 500, represented by the numbers located in each of the 64 regions within exposure metering region 400. In one embodiment, the weights for the regions may range from 0-15, although a greater or smaller range of possible weights (as well as a larger or smaller number of regions) may be employed if such a scheme is empirically deemed to be beneficial. The metering weighting matrix 500 shown in FIG. 5 is said to be "center-weighted" because the weighted values increase radially from the outer edges towards the center of the metering weighting matrix, as seen by the values ranging from 1 around the outer edge of exposure metering region 400 to 9 near the center of exposure metering region 400.

By summing the products of each region's average luminance (i.e., the average luminance value for the pixels comprising the region) and the region's "weight" value from the metering weighting matrix, and then dividing that summed value by the sum of the weights of all the regions in the metering weighting matrix, a weighted average value, referred to herein as the "AE Average" or a "weighting matrix adjusted mean" may be calculated. This is merely one formula for calculating a weighted average of the scene's luminance values, and other formulas may be empirically determined and applied in order to calculate the "AE Average" in a desired manner. Based on the value of the AE Average for a given scene, the auto exposure method may be able to drive the camera's exposure parameter values in an intelligent and desirable way. The weighting scheme and values described above are merely exemplary and are only one embodiment of a scheme that has been empirically determined to produce satisfactory images for most scene compositions. Further, different weighting schemes may be appropriate for different applications. For example, different weighting schemes may be employed for taking a photo, taking a video, or videoconferencing.

Figure 6:
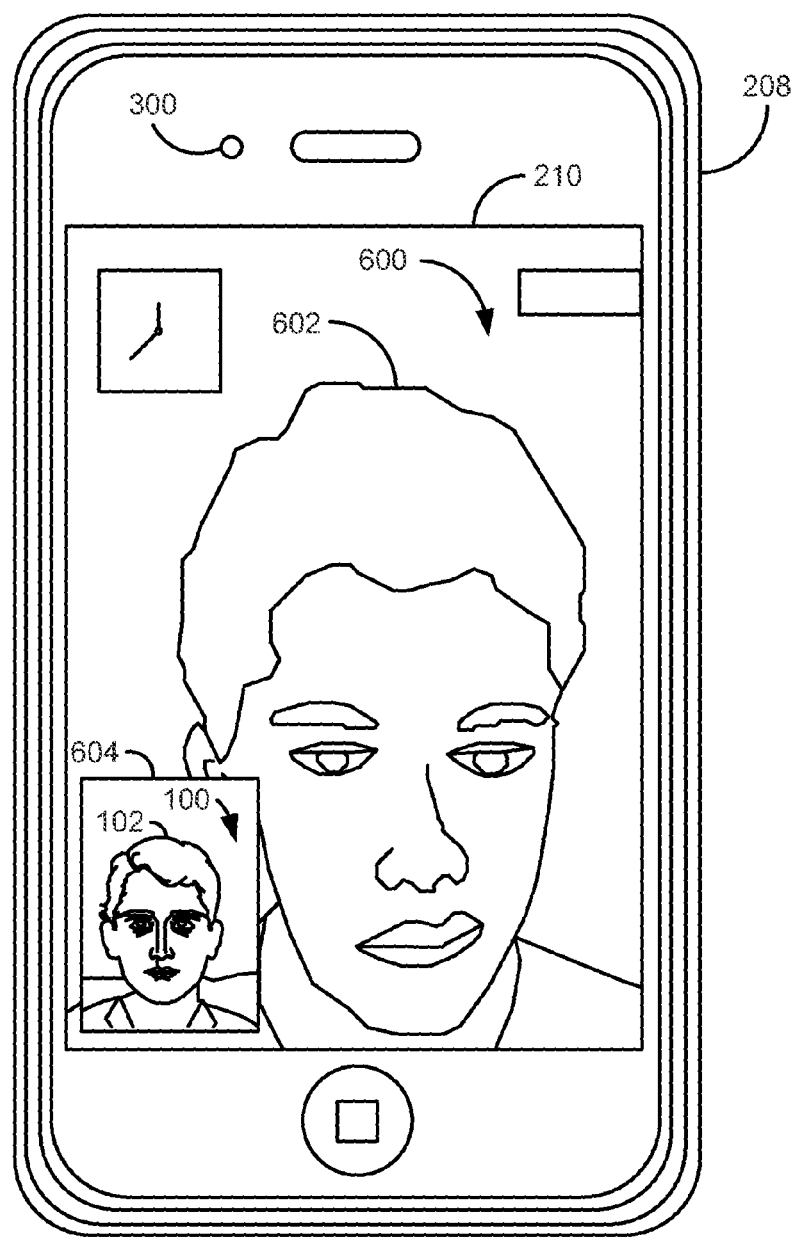
FIG. 6 illustrates a handheld and/or mobile videoconferencing application executed on a personal electronic device's preview screen, in accordance with one embodiment.

Referring now to FIG. 6, a handheld and/or mobile videoconferencing application being executed on personal electronic device 208's preview screen 210 is shown, in accordance with one embodiment. In this embodiment, human subject 102, located in scene 100 is engaged in a videoconference with a far-end video conferencing unit currently pointed at indoor scene 600 with human subject 602. In order to keep the camera 300 pointed at his face, human subject 102 may be presented with a small preview window 604 at some location on preview screen 210 indicating the image frame that is currently being transmitted to far-end video conferencing participant 602's videoconferencing device. By utilizing preview window 604, human subject 102 may ensure that his face remains centered in the image frame, such that a small, centered and center-weighted exposure metering region (such as that described in relation to FIG. 5) will continue to produce satisfactory auto exposed image frames. The location and size of preview window 604 may be customizable by the user of camera device 208 or may optionally be toggled off.

Figure 7:
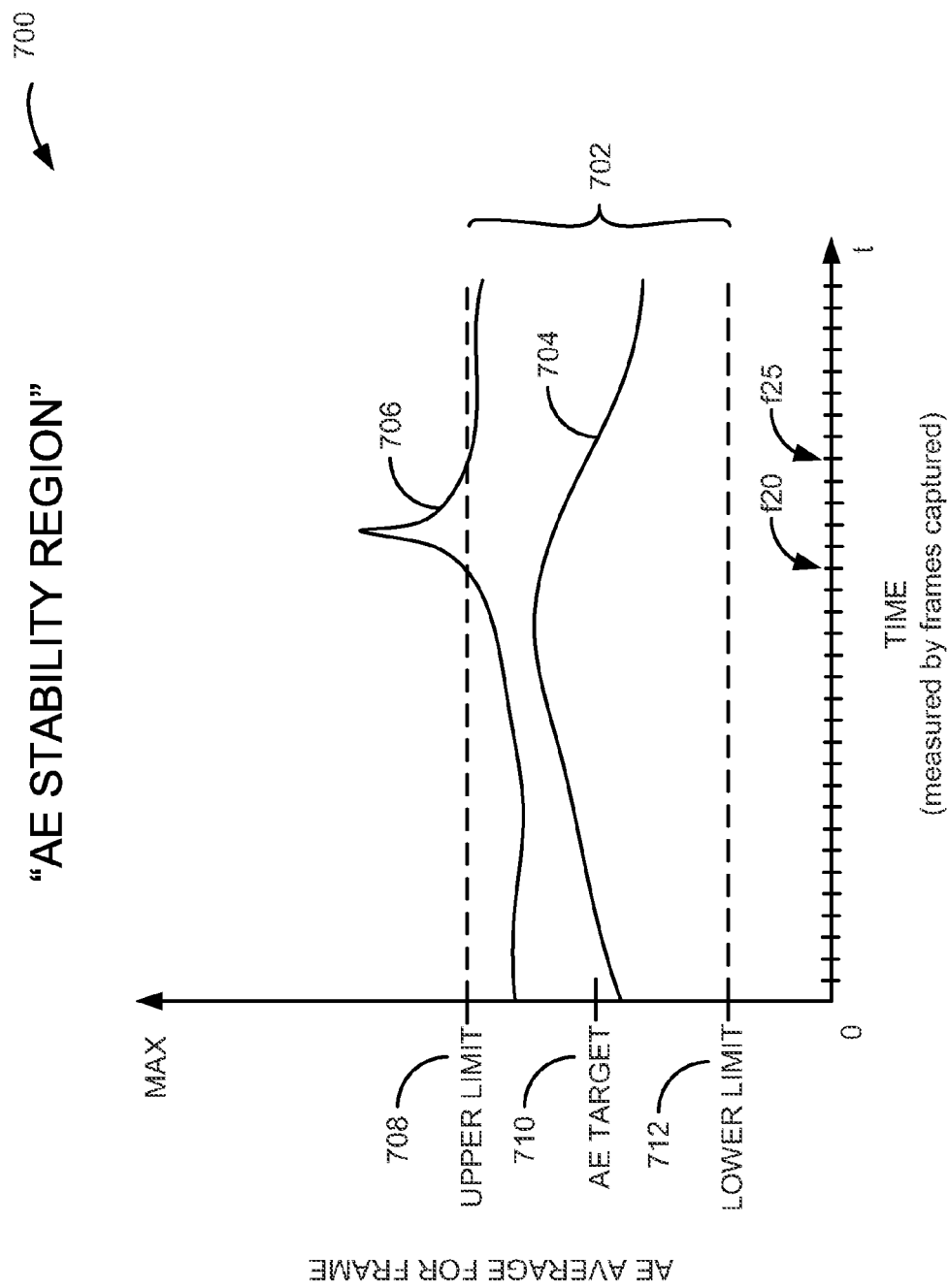
FIG. 7 illustrates a graph representing the AE Averages of two hypothetical scenes over time and an AE stability region, in accordance with one embodiment.

Referring now to FIG. 7, a graph 700 with two lines 704/706 representative of the AE Average values over time of two hypothetical scenes and an AE stability region 702 are shown, in accordance with one embodiment. The y-axis of graph 700 represents the AE Average for a given image frame. The x-axis of graph 700 represents time, as measured by the number of frames captured. Each vertical "tick mark" on the x-axis is meant to represent a subsequent frame captured by the image sensor. In one embodiment, a relatively large AE stability region 702 (as compared to the AE stability region typically used in traditional, fixed camera videoconferencing applications) is used to aid in the AE method's determination of when (and to what degree) to adjust the camera's exposure parameter values. The AE stability region 702 defines a range of acceptable AE Average brightness values for the image frame. The AE stability region 702 may be centered on a fixed, AE Target 710 brightness value, e.g., a 17% gray value. If the "AE Average" for the image frame, i.e., the calculated weighted brightness average over the desired exposure metering region(s), is within the AE stability region 702, the embodiment may leave the camera's exposure parameter values at their current levels. However, if the "AE Average" for the image frame is outside of the AE stability region 702 (either higher than the upper limit of the AE stability region 708 or lower than the lower limit of the AE stability region 712), the embodiment may change the camera's exposure parameter values appropriately to attempt to adjust the next frame's AE Average back towards the stability region 702. In one example, the upper limit of the AE stability region 708 is more than twice the lower limit of the AE stability region 712, and the AE stability region 702 is centered on the AE Target 710. One set of exemplary values for the AE stability region 702 is: a 24% gray value for the upper limit 708, a 17% gray value for the AE Target 710, and a 10% gray value for the lower limit 712 of the AE stability region. Such an AE stability region 702 range is larger than what is typically utilized in traditional, fixed camera videoconferencing applications. Using this larger AE stability region 702 range helps to keep the exposure stable in high contrast scenes, such as those that are strongly back lit or strongly front lit. The larger AE stability region 702 range also helps to reduce oscillations during auto exposure convergence, as will be described in further detail below.

AE convergence is the process by which an AE method attempts to adjust the AE Average of the scene being captured back to an acceptable brightness range, e.g., within an AE stability region. The rate at which the AE method attempts to adjust the AE Average of the scene may be referred to herein as the "AE convergence speed." In some embodiments herein, a relatively fast AE convergence speed (as compared to those typically used in traditional, fixed camera videoconferencing applications) is used. A fast AE convergence speed, along with a relatively large AE stability region, can improve the appearance of a scene lighting transition by quickly reaching a new stable AE Average point. Using a fast AE convergence speed may also aid in the efficiency of the video encoding in videoconferencing applications. In preferred embodiments, the AE convergence speed should be fast, but limited to avoid unwanted video oscillations. As the AE stability region 702 increases in size, the AE convergence speed can be made faster.

In one embodiment, in an attempt to change the scene's AE Average, the AE method may adjust the camera's exposure parameter values for each frame that is captured by the camera's image sensor. For each frame that is captured, a "brightness change step size" may first be calculated. The "brightness change step size" will define the magnitude of change in brightness that the AE method will attempt to impose on the next image frame captured by the camera's image sensor. The larger the magnitude of the step size, the fast the AE convergence speed will be. In one embodiment, the "brightness change step size" is calculated according to the following formula: Brightness_Change_Step_Size=alpha*|(Current_AE_Average−AE_Target)|; where: 0.2<alpha<1 (Equation 1). In a preferred embodiment, alpha is set to be no smaller than the fractional value: 60/255.

By calculating a brightness change step size that is dependent on the distance, i.e., the magnitude of the difference, between the current AE Average and the AE Target, the AE method is able to adjust the camera's exposure parameter values to attempt to quickly bring the AE Average back within the AE stability region. However, if the AE stability region is not sufficiently large, the use of too large of a convergence step size could have the unwanted effect of causing the AE Average to actually "jump over" the AE stability region from one frame to the next or over the course of several frames. For example, if the AE Average is much higher than upper limit of the AE stability region, Equation 1 above will calculate a large step size which, if the AE stability region is sufficiently small, could cause the AE Average to actually be below the lower limit of the AE stability region in the next frame. This type of constant video oscillation can cause unwanted flickering on the camera device's preview screen and lead to difficulties in temporal predictions for the video encoder. A more preferred embodiment would employ a large AE stability range, as well as a fast AE convergence speed (i.e., a large step size), but stop adjusting the camera's exposure parameter values as soon as the AE Average for the scene returned to the accepted AE stability region. It has been empirically determined that a smaller number of "bad" image frames in a videoconferencing application, e.g., during a rapid lighting changes, is more visually appealing to users than a longer period of "bad" image frames as the AE method gradually changes the camera's exposure parameter values over time to bring the AE Average for the scene back into an acceptable AE stability region. Thus, a fast, distance-dependent AE convergence speed—combined with a large AE stability region—are preferable techniques for handheld and/or mobile videoconferencing applications.

By way of example, line 704 in FIG. 7 represents the AE Average over time of a scene being captured by a handheld and/or mobile personal electronic device executing a videoconferencing application. As shown in FIG. 7, the scene represented by line 704 always remained within the AE stability region 702. Thus, the AE method never needed to adjust the camera's exposure parameter values to attempt to bring the AE Average back within the acceptable AE stability region. By contrast, line 706 in FIG. 7 represents a scene whose AE Average began within the AE stability region 702 but that, at captured frame 20 (labeled f20 in FIG. 7), exceeded the upper limit 708 of the AE stability region 702. At that point, the AE method operating on the scene represented by line 706 acted to change the camera's exposure parameter values to attempt to adjust the next frame's AE Average back towards the AE stability region 702 by an amount equal to the calculated "brightness change step size." As shown in FIG. 7, by the fifth captured frame after the AE Average left the AE stability region (labeled f25 in FIG. 7), the AE method was able to cause the scene's brightness, i.e., AE Average, to converge back to the AE stability region. At that point, the scene represented by line 706 maintained an AE Average within the AE stability region, so no further action was needed from the AE method.

Figure 8:
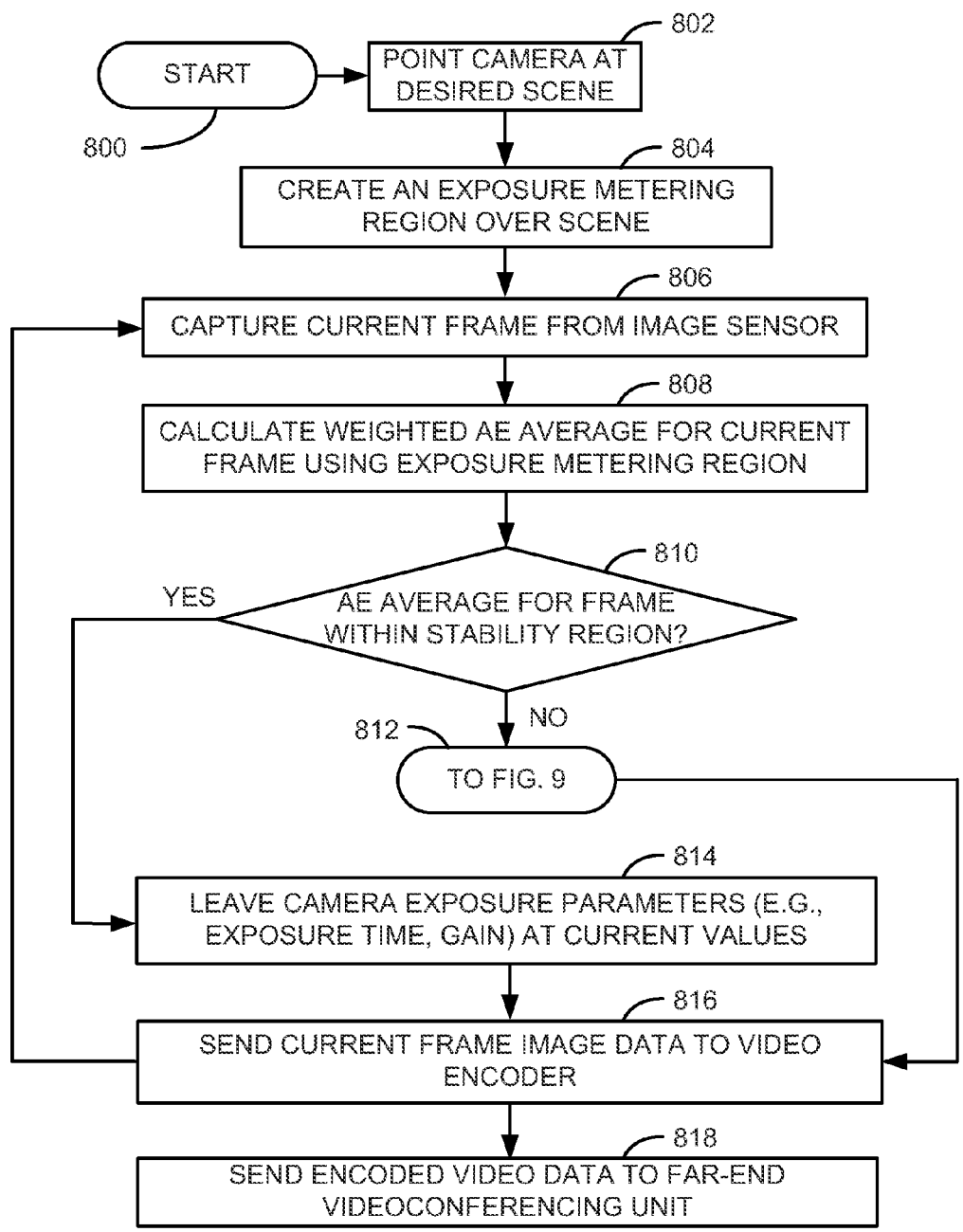
FIG. 8 illustrates, in flowchart form, one embodiment of a process for auto exposure in a handheld/mobile personal electronic device using an AE stability region.

Referring now to FIG. 8, one embodiment of a process for auto exposure in a handheld/mobile personal electronic device using an AE stability region is shown in flowchart form. First, the process begins at Step 800. Next, the user points the camera at the desired scene (Step 802). Next, the AE method creates an exposure metering region(s) over the desired areas over the scene (Step 804). At this point, the AE method may begin to process image frames being captured by the image sensor (Step 806). A weighted AE Average is calculated for the current frame using the desired exposure metering region(s) and one or more predetermined metering weighting matrixes (Step 808). Once the AE Average is calculated for the current frame, the AE method may determine wither the AE Average is within the AE stability region (Step 810). If the AE Average is within the AE stability region, the process may proceed to Step 814 and leave the camera's exposure parameters at their current values. If instead, the AE Average is not within the AE stability region, the process may proceed to FIG. 9 (Step 812), where brightness changes step size may be calculated and appropriate adjustments may be made to the camera's exposure parameter values, as is explained in further detail below in relation to FIG. 9. At this point, the current frame's image data may be sent to a video encoder (Step 816) and, once encoded, be sent to a far-end videoconferencing unit to be received, decoded, and displayed (Step 818). At Step 816, once the current image frame has been captured, the process simply returns to Step 806 to capture the next image frame, calculate its AE Average, make the appropriate adjustments to the camera's exposure parameter values if needed, and repeat the process of FIG. 8 again until the user indicates a desire to no longer execute the image capture, video capture, or videoconferencing application.

Figure 9:
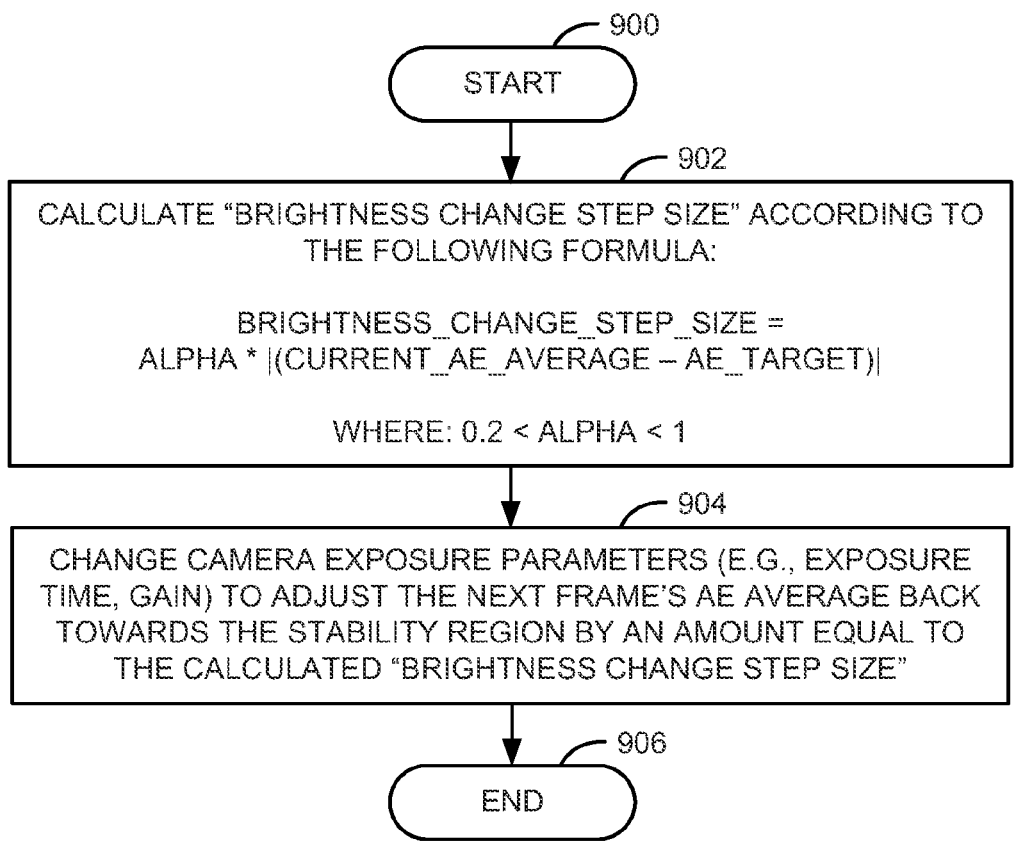
FIG. 9 illustrates, in flowchart form, one embodiment of a process for determining AE convergence speeds.

Referring now to FIG. 9, one embodiment of a process for determining AE convergence speeds is shown in flowchart form. First, the process begins at Step 900. Next, brightness change step size may be calculated according to Equation 1 above (Step 902), Next, the AE method changes the camera's exposure parameter values to adjust the next frame's AE Average back towards the AE stability region by an amount equal to the calculated brightness change step size (Step 904). At this point, the process of FIG. 9 ends (Step 906), and control of the AE method may be returned to Step 816 in FIG. 8.

Figure 10:
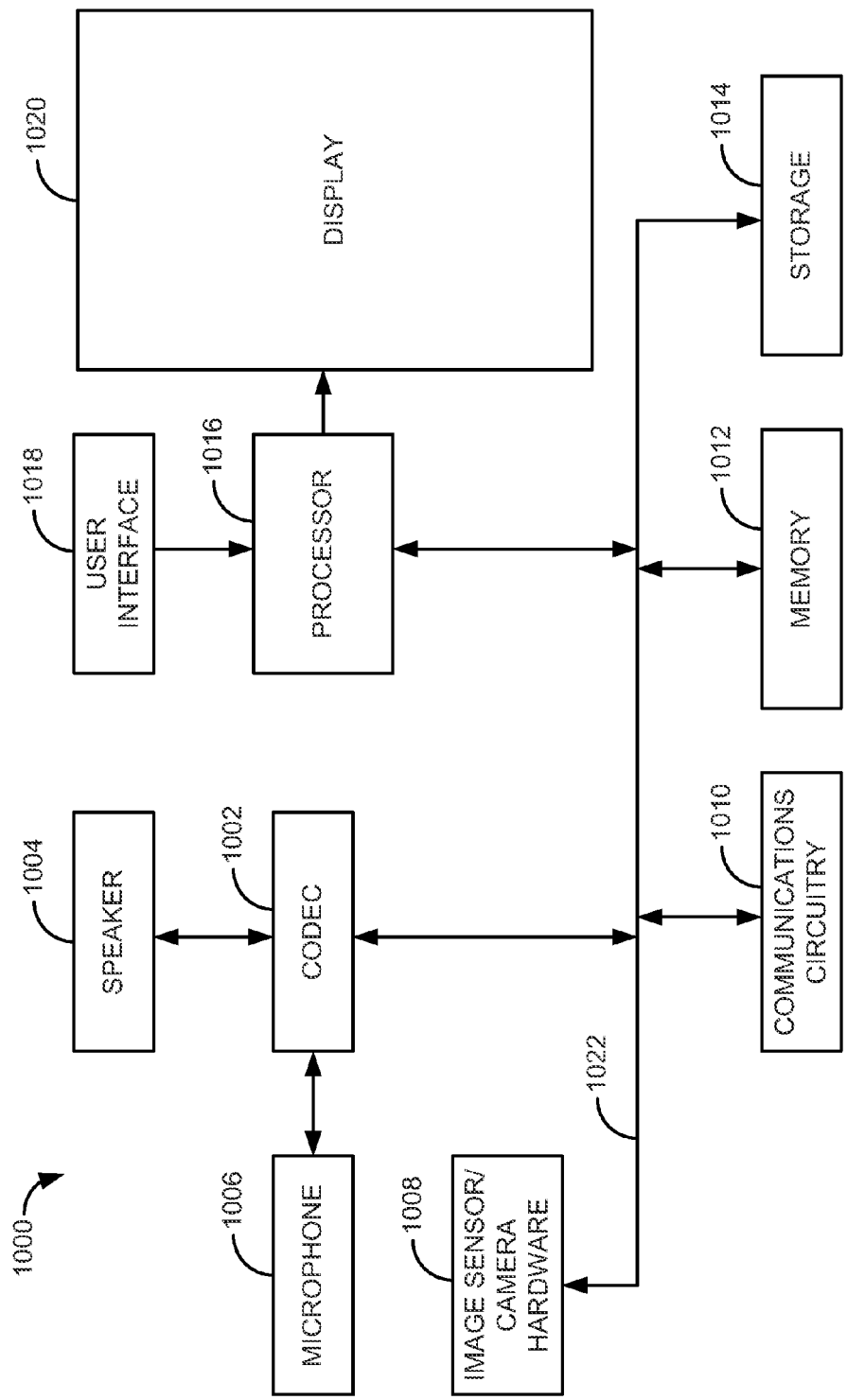
FIG. 10 illustrates a simplified functional block diagram of a personal electronic device, in accordance with one embodiment.

Referring now to FIG. 10, a simplified functional block diagram of a representative personal electronic device 1000 according to an illustrative embodiment, e.g., a mobile phone possessing one or more camera devices, such as camera device 208, is shown. The personal electronic device 1000 may include a processor 1016, storage device 1014, user interface 1018, display 1020, coder/decoder (CODEC) 1002, bus 1022, memory 1012, communications circuitry 1010, a speaker or transducer 1004, a microphone 1006, and one or more image sensors with associated camera hardware 1008. Processor 1016 may be any suitable programmable control device and may control the operation of many functions, such as the auto exposure algorithm discussed above, as well as other functions performed by personal electronic device 1000. Processor 1016 may drive display 1020 and may receive user inputs from the user interface 1018.

Storage device 1014 may store media (e.g., photo and video files), software (e.g., for implementing various functions on device 1000), preference information (e.g., media playback preferences), personal information, and any other suitable data. Storage device 1014 may include one more storage mediums, including for example, a hard-drive, permanent memory such as ROM, semi-permanent memory such as RAM, or cache.

Memory 1012 may include one or more different types of memory which may be used for performing device functions. For example, memory 1012 may include cache, ROM, and/or RAM. Bus 1022 may provide a data transfer path for transferring data to, from, or between at least storage device 1014, memory 1012, and processor 1016. CODEC 1002 may be included to convert digital audio signals into analog signals for driving the speaker 1004 to produce sound including voice, music, and other like audio. The CODEC 1002 may also convert audio inputs from the microphone 1006 into digital audio signals for storage in memory 1012 or storage 1014. The CODEC 1002 may include a video CODEC for processing digital and/or analog video signals.

User interface 1018 may allow a user to interact with the personal electronic device 1000. For example, the user input device 1018 can take a variety of forms, such as a button, keypad, dial, a click wheel, or a touch screen. Communications circuitry 1010 may include circuitry for wireless communication (e.g., short-range and/or long range communication). For example, the wireless communication circuitry may be Wi-Fi® enabling circuitry that permits wireless communication according to one of the 802.11 standards. (Wi-Fi® is a registered trademark of the Wi-Fi Alliance.) Other wireless network protocols standards could also be used, either as an alternative to the identified protocols or in addition to the identified protocols. Other network standards may include BLUETOOTH®, the Global System for Mobile Communications (GSM®), and code division multiple access (CDMA) based wireless protocols. (BLUETOOTH® is a registered trademark of Bluetooth SIG. Inc., and GSM® is a registered trademark of GSM Association.) Communications circuitry 1010 may also include circuitry that enables device 1000 to be electrically coupled to another device (e.g., a computer or an accessory device) and communicate with that other device.

In one embodiment, the personal electronic device 1000 may be a personal electronic device dedicated to processing media such as audio and video. For example, the personal electronic device 1000 may be a media device such as media player, e.g., an MP3 player, a game player, a remote controller, a portable communication device, a remote ordering interface, an audio tour player, or other suitable personal device. The personal electronic device 1000 may be battery-operated and highly portable so as to allow a user to listen to music, play games or video, record video or take pictures, communicate with others, and/or control other devices. In addition, the personal electronic device 1000 may be sized such that it fits relatively easily into a pocket or hand of the user. By being handheld, the personal computing device 1000 may be relatively small and easily handled and utilized by its user and thus may be taken practically anywhere the user travels.

As discussed previously, the relatively small form factor of certain types of personal electronic devices 1000, e.g., personal media devices, enables a user to easily manipulate the device's position, orientation, and movement. Accordingly, the personal electronic device 1000 may provide for improved techniques of sensing such changes in position, orientation, and movement to enable a user to interface with or control the device 1000 by affecting such changes. Further, the device 1000 may include a vibration source, under the control of processor 1016, for example, to facilitate sending motion, vibration, and/or movement information to a user related to an operation of the device 1000. The personal electronic device 1000 may also include one or more image sensors and associated camera hardware 1008, e.g., a front-facing or rear-facing camera, that enables the device 1000 to capture an image or series of images, i.e., video, continuously, periodically, at select times, and/or under select conditions.

The foregoing description is not intended to limit or restrict the scope or applicability of the inventive concepts conceived of by the Applicants. As one example, although the present disclosure focused on auto exposure techniques for mobile and/or handheld videoconferencing applications; it will be appreciated that the teachings of the present disclosure can be applied to other contexts, e.g.: traditional fixed camera videoconferencing applications, conventional cameras, image capture, and video capture. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method comprising:
   using an image sensor to capture an image representative of a scene;
   defining an exposure metering region over a desired area of the image;
   calculating a weighted average value for the exposure metering region;
   comparing the weighted average value to a predetermined range of acceptable values; and
   adjusting an exposure parameter for the image sensor based at least in part on the comparison of the weighted average value to the predetermined range of acceptable values.

2. The method of claim 1, wherein the exposure metering region comprises a rectangular region.

3. The method of claim 2, wherein the width of the exposure metering region subtends a central angle of no more than 35 degrees, and wherein the height of the exposure metering region subtends a central angle of no more than 35 degrees.

4. The method of claim 2, wherein the longer dimension of the exposure metering region subtends a central angle of no more than 50 degrees, and wherein the shorter dimension of the exposure metering region subtends a central angle of no more than 35 degrees.

5. The method of claim 1, wherein the exposure metering region is configured to remain centered in the image.

6. The method of claim 1, wherein the act of adjusting an exposure parameter for the image sensor based at least in part on the magnitude of the difference between the weighted average value and the center of the predetermined range of acceptable values comprises adjusting one or more of the following: an exposure time, a shutter speed, ISO, a gain level, and an f-number.

7. The method of claim 1, wherein the weighted average value and the range of acceptable values comprise pixel luminance values.

8. The method of claim 1, wherein the act of calculating a weighted average value for the exposure metering region comprises calculating one or more of the following: a mean, a center-weighted mean, a median, and a weighting matrix adjusted mean.

9. The method of claim 1, wherein the act of adjusting an exposure parameter for the image sensor is configured to occur according to a predetermined distance-dependent convergence step size function.

10. The method of claim 1, wherein the predetermined range of acceptable values comprises a lower limit and an upper limit, and wherein the upper limit is at least two times as large as the lower limit.

11. The method of claim 10, wherein the predetermined range of acceptable values is centered on a predetermined target value.

12. A method comprising:
    using an image sensor to capture an image representative of a scene;
    defining an exposure metering region over a desired area of the image;
    calculating a weighted average value for the exposure metering region;
    calculating a magnitude of the difference between the calculated weighted average value and a predetermined target value;
    and
    adjusting an exposure parameter for the image sensor based at least in part on the magnitude of the difference between the calculated weighted average value and the predetermined target value.

13. The method of claim 12, wherein the act of calculating a weighted average value for the exposure metering region comprises calculating one or more of the following: a mean, a center-weighted mean, a median, and a weighting matrix adjusted mean.

14. The method of claim 12, wherein the act of adjusting an exposure parameter for the image sensor is configured to occur according to a predetermined distance-dependent convergence step size function.

15. The method of claim 12, wherein the predetermined target value is no greater than 17% of the maximum signal strength capturable by the image sensor.

16. The method of claim 12, wherein the predetermined step size factor is no less than the fractional value: 60/255.

17. A method of auto exposing a physical scene comprising:
receiving a first image frame from an image sensor, wherein the first image frame comprises information representative of the physical scene and comprising a plurality of pixels;
defining an exposure metering region over the first image frame; and
adjusting an exposure parameter for the image sensor based at least in part on a calculated step size value, wherein the calculated step size value is based at least in part on a comparison of a weighted average of pixel luminance values in the exposure metering region over the first image frame to a predetermined target luminance value.

18. The method of claim 17, further comprising:
receiving a second image frame from an image sensor, wherein the second image frame comprises information representative of the physical scene and comprising a plurality of pixels; and
defining an exposure metering region over the second image frame,
wherein the second image frame is representative of the physical scene at a later point in time than the first image frame, and
wherein the magnitude of the adjustment to the exposure parameter is configured such that a weighted average of pixel luminance values in the exposure metering region of the second image frame differs from the weighted average of pixel luminance values in the exposure metering region of the first image frame by the step size value.

19. The method of claim 17, wherein the weighted average of pixel luminance values in the exposure metering region comprises one or more of the following: a mean, a center-weighted mean, a median, and a weighting matrix adjusted mean.

20. The method of claim 17, wherein the predetermined target luminance value is no greater than 17% of the maximum signal strength capturable by the image sensor.

21. A non-transitory computer usable medium having a computer readable program code embodied therein, wherein the computer readable program code is adapted to be executed to:
receive a first image frame from an image sensor, wherein the first image frame comprises information representative of the physical scene and comprising a plurality of pixels;
define an exposure metering region over the first image frame; and
adjust an exposure parameter for the image sensor based at least in part on a calculated step size value, wherein the calculated step size value is based at least in part on a comparison of a weighted average of pixel luminance values in the exposure metering region over the first image frame to a predetermined target luminance value.

22. The non-transitory computer usable medium of claim 21, wherein the computer readable program code is further adapted to be executed to:
receive a second image frame from an image sensor, wherein the second image frame comprises information representative of the physical scene and comprising a plurality of pixels; and
define an exposure metering region over the second image frame,
wherein the second image frame is representative of the physical scene at a later point in time than the first image frame, and
wherein the magnitude of the adjustment to the exposure parameter is configured such that a weighted average of pixel luminance values in the exposure metering region of the second image frame differs from the weighted average of pixel luminance values in the exposure metering region of the first image frame by the step size value.

23. The non-transitory computer usable medium of claim 21, wherein the weighted average of pixel luminance values in the exposure metering region comprises one or more of the following: a mean, a center-weighted mean, a median, and a weighting matrix adjusted mean.

24. The non-transitory computer usable medium of claim 21, wherein the predetermined target luminance value is no greater than 17% of the maximum signal strength capturable by the image sensor.

25. A non-transitory computer usable medium having a computer readable program code embodied therein, wherein the computer readable program code is adapted to be executed to implement the method of claim 12.

* * * * *